US008421794B2

(12) United States Patent
Du et al.

(10) Patent No.: US 8,421,794 B2
(45) Date of Patent: Apr. 16, 2013

(54) PROCESSOR WITH ADAPTIVE MULTI-SHADER

(75) Inventors: Yun Du, San Diego, CA (US); Guofang Jiao, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1131 days.

(21) Appl. No.: 11/690,358

(22) Filed: Mar. 23, 2007

(65) Prior Publication Data
US 2008/0235316 A1   Sep. 25, 2008

(51) Int. Cl.
G06T 15/00 (2011.01)
G06F 15/16 (2006.01)
G06F 7/52 (2006.01)
G09G 5/00 (2006.01)

(52) U.S. Cl.
USPC ............ 345/419; 345/502; 345/614; 708/513

(58) Field of Classification Search ................... 345/426, 345/613, 614, 502, 419; 711/105; 708/513
See application file for complete search history.

(56) References Cited

U.S. PATENT DOCUMENTS

| | | | |
|---|---|---|---|
| 6,897,871 B1 | 5/2005 | Morein et al. | |
| 6,954,211 B2* | 10/2005 | Michail et al. | 345/581 |
| 7,079,156 B1* | 7/2006 | Hutchins et al. | 345/606 |
| 7,239,322 B2* | 7/2007 | Lefebvre et al. | 345/522 |
| 7,339,590 B1* | 3/2008 | Moskal et al. | 345/501 |
| 2004/0145589 A1* | 7/2004 | Prokopenko et al. | 345/581 |
| 2004/0164987 A1* | 8/2004 | Aronson et al. | 345/522 |
| 2005/0066205 A1* | 3/2005 | Holmer | 713/320 |
| 2005/0122334 A1 | 6/2005 | Boyd et al. | |
| 2006/0053189 A1* | 3/2006 | Mantor | 708/490 |
| 2007/0091089 A1* | 4/2007 | Jiao et al. | 345/426 |
| 2008/0077011 A1* | 3/2008 | Azuma et al. | 600/443 |

FOREIGN PATENT DOCUMENTS
WO    2005029406    3/2005

OTHER PUBLICATIONS

Victor Moya et al: "A Single (Unified) Shader GPU Microarchitecture for Embedded Systems", High Performance Embedded Architectures and Compilers Lecture Notes in Computer Science;; LNCS, Springer, Berlin. DE. vol. 3793. (Jan. 1, 2001), pp. 286-301.
International Search Report—PCT/US08/057897, International Search Authority—European Patent Office—Sep. 4, 2008.
Written Opinion—PCT/US08/057897, International Search Authority—European Patent Office—Sep. 4, 2008.

(Continued)

Primary Examiner — Ke Xiao
Assistant Examiner — Robert Craddock
(74) Attorney, Agent, or Firm — James R. Gambale, Jr.

(57) ABSTRACT

The disclosure describes an adaptive multi-shader within a processor that uses one or more high-precision arithmetic logic units (ALUs) and low-precision ALUs to process data based on the type of the data. Upon receiving a stream of data, the adaptive multi-shader first determines the type of the data. For example, the adaptive multi-shader may determine whether the data is suitable for high-precision processing or low-precision processing. The adaptive multi-shader then processes the data using the high-precision ALUs when the data is suitable for high-precision processing, and processes the data using the high-precision ALUs and the low-precision ALUs when the data is suitable for low-precision processing. The adaptive multi-shader may substantially reduce power consumption and silicon size of the processor by implementing the low-precision ALUs while maintaining the ability to process data using high-precision processing by implementing the high-precision ALUs.

36 Claims, 9 Drawing Sheets

OTHER PUBLICATIONS

U.S. Appl. No. 11/472,701, filed Jun. 21, 2006, entitled "Unified virtual addressed register file".

U.S. Appl. No. 11/550,344, filed Oct. 17, 2006, entitled "Graphics processing unit with shared arithmetic logic unit".

U.S. Appl. No. 11/535,809, filed Sep. 27, 2006, entitled "Graphics processing unit with unified vertex cache and shader register file".

Taiwan Search Report—TW097110316—TIPO—Jul. 4, 2011.

* cited by examiner

PROCESSOR WITH ADAPTIVE MULTI-SHADER

TECHNICAL FIELD

This disclosure relates to multi-media processors and, more particularly, techniques for processing data with graphics processing units.

BACKGROUND

A multi-media processor may include a graphics processing unit (GPU), a video processing unit, a still-image processing unit, and an audio processing unit. For example, a GPU is a dedicated graphics rendering device utilized to manipulate and display computerized graphics on a display. GPUs are built with a highly-parallel structure that provides more efficient processing than typical, general-purpose central processing units (CPUs) for a range of complex graphic-related algorithms. For example, the complex algorithms may correspond to representations of three-dimensional computerized graphics. A GPU may implement a number of so-called "primitive" graphics operations, such as operations that form points, lines, and triangles, to create complex, three-dimensional images on a display more quickly than drawing the images directly to the display with a CPU. GPUs may be used in a wide variety of applications, and are very common in graphic-intensive applications, such as video gaming.

Vertex shading and pixel shading are often utilized to determine final surface properties of a computerized image, such as light absorption and diffusion, texture mapping, light relation and refraction, shadowing, surface displacement, and post-processing effects. GPUs typically include a number of pipeline stages such as one or more shader stages, setup stages, rasterizer stages, and interpolation stages.

A vertex shader, for example, is typically applied to image data, such as the geometry for an image, and the vertex shader generates vertex coordinates and attributes of vertices within the image data. Vertex attributes include color, normal, and texture coordinates associated with a vertex. One or more primitive setup and rejection modules may form primitive shapes such as points, lines, or triangles, and may reject hidden or invisible primitive shapes based on the vertices within the image data. An attribute setup module computes gradients of attributes within the primitive shapes for the image data. Once the attribute gradient values are computed, primitive shapes for the image data may be converted into pixels, and pixel rejection may be performed with respect to hidden primitive shapes.

An attribute interpolator then interpolates the attributes over pixels within the primitive shapes for the image data based on the attribute gradient values, and sends the interpolated attribute values to the fragment shader for pixel rendering. Results of the fragment shader are output to a post-processing block and a frame buffer for presentation of the processed image on the display. In some cases, this process may be performed using a vertex shader and a fragment shader arranged as successive stages of the GPU pipeline. In other cases, this process may be performed using a multi-shader that is capable of operating as both a vertex shader and a fragment shader coupled to the GPU pipeline.

SUMMARY

In general, the disclosure describes an adaptive multi-shader within a processor that uses one or more high-precision arithmetic logic units (ALUs) and low-precision ALUs to process data based on the type of the data. The adaptive multi-shader is coupled to a processing pipeline and operates as one or more of a vertex shader, a fragment shader, a video shader, a still-image shader, and an audio shader to process data received from components of the processing pipeline. The adaptive multi-shader may substantially reduce power consumption and silicon size of the processor by implementing the low-precision ALUs while maintaining the ability to process data using high-precision processing by implementing the high-precision ALUs.

Upon receiving a stream of data, the adaptive multi-shader first determines the type of the data. For example, the adaptive multi-shader may determine whether the data is suitable for high-precision processing or low-precision processing. The adaptive multi-shader then processes the data using the high-precision ALUs when the data is suitable for high-precision processing, and processes the data using the high-precision ALUs and the low-precision ALUs when the data is suitable for low-precision processing. As an example, the adaptive multi-shader may include two low-precision ALUs and two high-precision ALUs. The adaptive multi-shader determines whether the data is vertex image data suitable for high-precision processing or pixel image data suitable for low-precision processing. When the data is vertex image data, the adaptive multi-shader generates a half-quad vertex thread that includes two vertices of the data in scalar format and processes the vertex thread using the two high-precision ALUs. When the data is pixel image data, the adaptive multi-shader generates a quad pixel thread that includes four pixels of the data in scalar format and processes the pixel thread using the two high-precision ALUs and the two low-precision ALUs.

In one embodiment, the disclosure provides a method comprising receiving a stream of data from a processing pipeline with an adaptive multi-shader that includes high-precision ALUs and low-precision ALUs. The method also comprises determining the type of the data included in the received stream, and processing the data using one or more of the high-precision ALUs and the low-precision ALUs based on the type of the data.

In another embodiment, the disclosure provides a method comprising receiving a stream of image data from a GPU pipeline with an adaptive multi-shader that includes two high-precision ALUs and two low-precision ALUs. The method also comprises determining whether the image data included in the received stream is vertex data or pixel data. The method further comprises processing the image data using the two high-precision ALUs when the image data is vertex data, and processing the image data using the two high-precision ALUs and the two low-precision ALUs when the image data is pixel data.

In another embodiment, the disclosure provides a computer-readable medium comprising instructions that cause a processor to receive a stream of data from a processing pipeline with an adaptive multi-shader that includes high-precision ALUs and low-precision ALUs. The instructions also cause the processor to determine the type of the data included in the received stream, and process the data using one or more of the high-precision ALUs and the low-precision ALUs based on the type of the data.

In a further embodiment, the disclosure provides a computer-readable medium comprising instructions that cause a processor to receive a stream of image data from a GPU pipeline with an adaptive multi-shader that includes two high-precision ALUs and two low-precision ALUs. The instructions further cause the processor to determine whether the image data included in the received stream is vertex data or pixel data. The instructions also cause the programmable processor to process the image data using the two high-precision ALUs when the image data is vertex data, and process the image data using the two high-precision ALUs and the two low-precision ALUs when the image data is pixel data.

In another embodiment, the disclosure provides a multi-shader comprising a thread generator, a thread scheduler, and a processing unit including high-precision ALUs and low-precision ALUs. The thread generator receives a stream of data from a processing pipeline and determines the type of the data included in the received stream. The thread scheduler directs the processing unit to process the data using one or more of the high-precision ALUs and the low-precision ALUs based on the type of the data.

In another embodiment, the disclosure provides a multi-shader comprising a thread generator, a thread scheduler, and a processing unit including two high-precision ALUs and two low-precision ALUs. The thread generator receives a stream of image data from a GPU pipeline and determines whether the image data included in the received stream is vertex data or pixel data. The thread scheduler directs the processing unit to process the image data using the two high-precision ALUs when the image data is vertex data, and directs the processing unit to process the image data using the two high-precision ALUs and the two low-precision ALUs when the image data is pixel data.

In a further embodiment, the disclosure provides a multi-shader comprising means for receiving a stream of data from a processing pipeline and determining the type of the data included in the received stream. The multi-shader also comprises means for processing the data using one or more of high-precision processing means and low-precision processing means based on the type of the data.

The techniques described herein may be implemented in hardware, software, firmware, or any combination thereof. If implemented in software, the techniques may be realized in whole or in part by a computer readable medium comprising instructions that, when executed by a processor, performs one or more of the methods described herein.

The details of one or more embodiments are set forth in the accompanying drawings and the description below. Other features, objects, and advantages of the invention will be apparent from the description and drawings, and from the claims.

DETAILED DESCRIPTION

In accordance with this disclosure, an adaptive multi-shader included within a processor uses one or more high-precision arithmetic logic units (ALUs) and low-precision ALUs to process received data based on the type of the data. The adaptive multi-shader is coupled to a processing pipeline and operates as one or more of a vertex shader, a fragment shader, a video shader, a still-image shader, and an audio shader to process data received from components of the processing pipeline. Upon receiving a stream of data, the adaptive multi-shader first determines the type of the data. For example, the adaptive multi-shader may determine whether the data is suitable for high-precision processing or low-precision processing. The adaptive multi-shader then processes the data using the high-precision ALUs when the data is suitable for high-precision processing, and processes the data using the high-precision ALUs and the low-precision ALUs when the data is suitable for low-precision processing.

The processor may comprise a multi-media processor, such as a graphics processing unit (GPU), a video processing unit, a still-image processing unit, or an audio processing unit. In some cases, the adaptive multi-shader may be shared by two or more multi-media processors. The adaptive multi-shader may then operate as several different types of shaders in order to concurrently process data for the two or more multi-media processors. For purposes of illustration, this disclosure primarily describes the adaptive multi-shader included within a GPU. However, the adaptive multi-shader may operate substantially similar in any of the other types of multi-media processors listed above.

Figure 1:
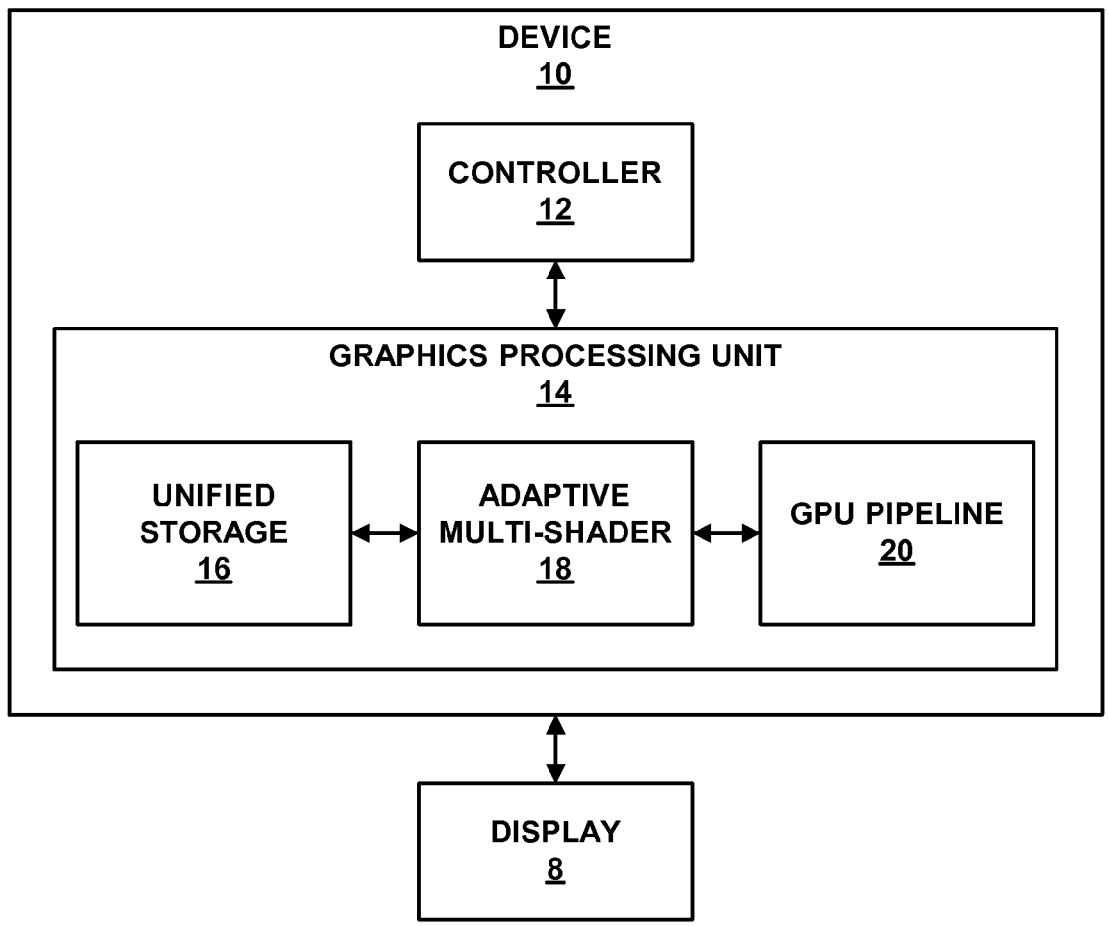
FIG. 1 is a block diagram illustrating an exemplary device including a graphics processing unit (GPU) that includes a GPU pipeline and an adaptive multi-shader that utilizes one or more high-precision arithmetic logic units (ALUs) and low-precision ALUs to process image data received from the GPU pipeline based on the type of the image data.

FIG. 1 is a block diagram illustrating an exemplary device 10 including a GPU 14 that includes a GPU pipeline 20 and an adaptive multi-shader 18 coupled to GPU pipeline 20 for processing computerized images. According to this disclosure, adaptive multi-shader 18 utilizes one or more high-precision ALUs and low-precision ALUs to process image data based on the type of the image data. Adaptive multi-shader 18 operates as both a vertex shader and a fragment shader to process image data received from GPU pipeline 20. Adaptive multi-shader 18 may substantially reduce power consumption and silicon size of GPU 14 by implementing the low-precision ALUs while maintaining the ability to process image data using high-precision processing by implementing the high-precision ALUs.

In the example of FIG. 1, device 10 includes a controller 12 capable of controlling operation of GPU 14. Controller 12 may also be capable of controlling operation of device 10. In accordance with the techniques described herein, GPU 14 includes a GPU pipeline 20, adaptive multi-shader 18 coupled to GPU pipeline 20, and unified storage 16 coupled to adaptive multi-shader 18. GPU 14 may implement adaptive multi-shader 18 and unified storage 16 in order to reduce the amount of data propagated through GPU pipeline 20. As discussed in greater detail below, components within GPU pipeline 20 may be rearranged relative to conventional GPU pipelines, which may improve the process of image processing and facilitate the use of adaptive multi-shader 18. Unified storage 16 may include multiple banks to resolve read and write port conflicts.

GPU 14 receives image data from controller 12 within device 10. The image data may correspond to representations of complex, two-dimensional or three-dimensional computerized graphics. GPU 14 processes the image data to present image effects, background images, or video gaming images, for example, to a user of device 10 via a display 8. The images may be formed as video frames in a sequence of video frames. Display 8 may comprise a liquid crystal display (LCD), a cathode ray tube (CRT) display, a plasma display, or another type of display integrated with or coupled to device 10.

In some cases, controller 12 may receive the image data from applications operating within device 10. For example, device 10 may comprise a computing device operating a video gaming application based on image data received from an internal hard drive or a removable data storage device. In other cases, controller 12 may receive the image data from applications operating external to device 10. For example, device 10 may comprise a computing device operating a video gaming application based on image data received from an external server via a wired or wireless network, such as the Internet. The image data may be received via streaming media or broadcast media, which may be wired, wireless or a combination of both.

When a user of device 10 triggers an image effect, selects a background image, or initiates a video game, controller 12 receives the corresponding image data from an application and sends the image data to GPU 14. GPU 14 processes the image data and prepares the image data for presentation on display 8. For example, GPU 14 may implement a number of primitive graphics operations, such as operations for forming lines and triangles, to create a three-dimensional image represented by the received image data on display 8. GPU pipeline 20 within GPU 14 includes a number of pipeline stages such as a vertex shader stage, a primitive setup and interpolation stage, and a fragment shader stage. According to the techniques described herein, adaptive multi-shader 18 combines shader cores for a vertex shader and a fragment shader. In some cases, adaptive multi-shader 18 may also combine shader cores for an attribute gradient setup module and an attribute interpolator.

When GPU 14 receives image data from controller 12, GPU pipeline 20 sends a stream of image data to adaptive multi-shader 18. Upon receiving the stream of image data, adaptive multi-shader 18 first determines the type of the image data. For example, adaptive multi-shader 18 may determine whether the image data is suitable for high-precision processing or low-precision processing. Adaptive multi-shader 18 then processes the image data using the high-precision ALUs when the image data is suitable for high-precision processing, and processes the image data using the high-precision ALUs and the low-precision ALUs when the image data is suitable for low-precision processing.

As an example, adaptive multi-shader 18 may include two low-precision ALUs and two high-precision ALUs. Adaptive multi-shader 18 determines whether the image data is vertex data suitable for high-precision processing or pixel data suitable for low-precision processing. When the image data is vertex data, adaptive multi-shader 18 generates a half-quad vertex thread that includes two vertices of the image data in scalar format and processes the vertex thread using the two high-precision ALUs. When the image data is pixel data, adaptive multi-shader 18 generates a quad pixel thread that includes four pixels of the image data in scalar format and processes the pixel thread using the two high-precision ALUs and the two low-precision ALUs.

Adaptive multi-shader 18 performs vertex shading to generate vertex coordinates and attributes of vertices within the computerized image. The vertex coordinates identify the vertices within the image data based on, for example, a four-dimensional coordinate system with X, Y, and Z (width, height, and depth) coordinates that identify a location of a vertex within the image data, and a W coordinate that comprises a perspective parameter for the image data. The attributes, for example, may include color, normal, and texture coordinates associated with a vertex. Adaptive multi-shader 18 then stores the vertex attributes in unified storage 16. Unified storage 16 stores attributes for the vertices within the image data and acts as a unified register file for adaptive multi-shader 18. In some embodiments, adaptive multi-shader 18 sends only the vertex coordinates of the vertices within the image data back to GPU pipeline 20. In other embodiments, adaptive multi-shader 18 may send the vertex coordinates along with other image data information back to the GPU pipeline 20. In this manner, GPU pipeline 20 is not clogged with the transfer of the attributes between stages, and can support increased throughput.

The primitive setup and interpolation stage in GPU pipeline 20 includes several sub-stages that each performs using either the vertex coordinates or the vertex attributes. For example, GPU pipeline 20 processes the image by performing primitive setup and primitive rejection based on the vertex coordinates to form primitives and discard a subset of the primitives that are unnecessary for the image. Primitives are the simplest types of geometric figures, including points, lines, triangles, and other polygons, and may be formed with one or more vertices within the image data. Primitives or portions of primitives may be rejected from consideration during processing of a specific frame of the image when the primitives or the portions of primitives are located on a backside of an object within the image frame, are hidden behind another object within the image frame, or are transparent within the image frame.

As another example, GPU pipeline 20 sends primitive threads to adaptive multi-shader 18, which prompts adaptive multi-shader 18 to process the image by performing attribute gradient setup based on the vertex attributes. The primitive threads may indicate primitives for the image data. Adaptive multi-shader 18 stores the primitive threads for the image data in unified storage 16. Adaptive multi-shader 18 retrieves the vertex attributes associated with the primitives for the image data from unified storage 16 to perform attribute gradient setup. GPU pipeline 20 also sends pixel threads to adaptive multi-shader 18, which prompts adaptive multi-shader 18 to process the image by performing attribute interpolation and pixel rendering based on attribute gradient values. The pixel thread information may indicate pixels within the primitives for the image data. Adaptive multi-shader 18 stores the pixel threads for the image data in the unified storage 16, and performs attribute interpolation. Adaptive multi-shader 18 also performs fragment shading to render pixels within the primitives for the image data and sends the processed pixel information to a post-processor for presentation of the image on display 8. Therefore, the vertex attributes are never introduced to GPU pipeline 20.

In some embodiments, GPU pipeline 20 is able to move only the primitives for the image data and the vertex coordinates that identify each of the vertices within the primitives by combining the shader cores in adaptive multi-shader 18 and storing the attributes for vertices within the image data in unified storage 16. In other embodiments, GPU pipeline 20 is able to move the primitives and the vertex coordinates along with other image data information. In addition, bottlenecks in GPU pipeline 20 may be substantially eliminated for primitives that include large numbers of attributes by removing the large amount of attribute data from GPU pipeline 20. Furthermore, combining the shader core for attribute gradient setup in adaptive multi-shader 18 may improve image processing speed within GPU 14 by performing the attribute gradient setup with adaptive multi-shader 18. GPU pipeline 20 defers sending the primitive threads to prompt adaptive multi-shader 18 to perform the computationally intensive setup of attribute gradients to just before attribute interpolation in GPU pipeline 20. By deferring the attribute gradient setup within adaptive multi-shader 18 until after rejection of the subset of the primitives that are unnecessary for the image within GPU pipeline 20, computations and power consumption may be substantially reduced as the attribute gradient setup will be performed on a subset of the primitives that are necessary for the image.

In the embodiment illustrated in FIG. 1, display 8 comprises a separate device from device 10. Display 8 may be coupled to device 10 either wirelessly or with a wired connection. For example, device 10 may comprise a server or other computing device of a wireless communication service provider, and display 8 may be included within a wireless communication device. In this case, as examples, display 8 may comprise a display within a mobile radiotelephone, a satellite radiotelephone, a portable computer with a wireless communication card, a personal digital assistant (PDA) equipped with wireless communication capabilities, or any of a variety of devices capable of wireless communication. As another example, device 10 may comprise a server or other computing device connected to display 8 via a wired network, and display 8 may be included within a wired communication device or a device not principally directed to communication.

In other embodiments, display 8 may be integrated within device 10. For example, device 10 may comprise a wireless communication device and display 8 may comprise a display within the wireless communication device. As another example, device 10 may comprise a desktop or notebook computer, and display 8 may comprise a dedicated monitor or display of the computer. Device 10 may also comprise a wired communication device or a device not principally directed to communication, and display 8 may comprise a display within the device. For example, device 10 may comprise a PDA or handheld video game device that includes display 8. Hence, in various embodiments, video imagery may be obtained from a remote device or from a local device, each of which may be a video server that generates video or video objects, or a video archive that retrieves stored video or video objects.

Figure 2:
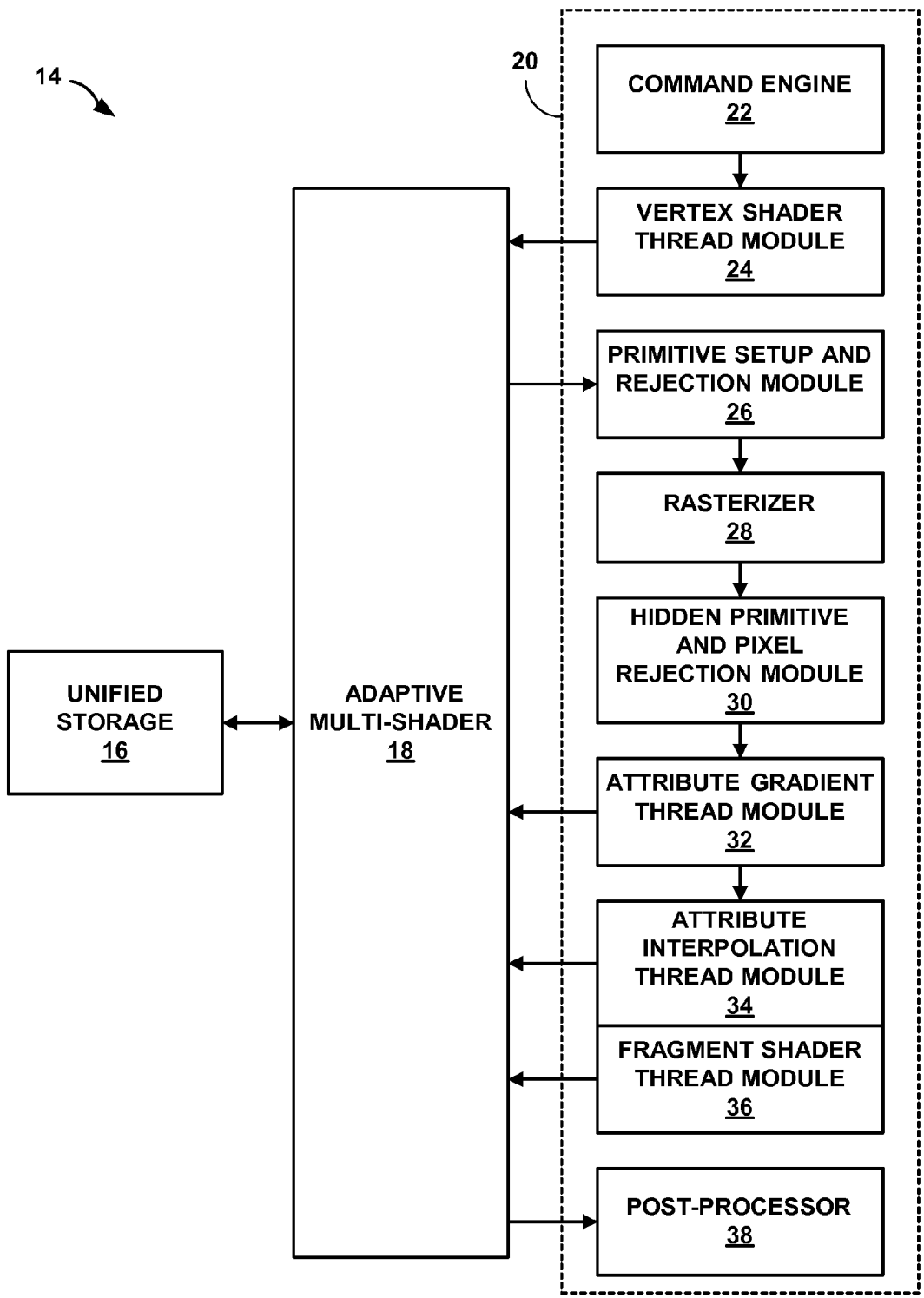
FIG. 2 is a block diagram illustrating a GPU that includes a GPU pipeline, an adaptive multi-shader coupled to the GPU pipeline, and a unified storage coupled to the adaptive multi-shader.

FIG. 2 is a block diagram illustrating GPU 14 from FIG. 1 including GPU pipeline 20, adaptive multi-shader 18 coupled to GPU pipeline 20, and unified storage 16 coupled to adaptive multi-shader 18. GPU pipeline 20 includes a command engine 22, vertex shader thread module 24, a primitive setup and rejection module 26, a rasterizer 28, a hidden primitive and pixel rejection module 30, an attribute gradient thread module 32, an attribute interpolation thread module 34, fragment shader thread module 36, and a post-processor 38.

GPU pipeline 20 within GPU 14 includes a number of pipeline stages such as a vertex shader stage, a primitive setup and interpolation stage, and a fragment shader stage. Adaptive multi-shader 18 combines shader cores for a vertex shader and a fragment shader. In the illustrated embodiment, adaptive multi-shader 18 also combines shader cores for an attribute gradient setup module and an attribute interpolator. In other embodiments, attribute gradient setup module and an attribute interpolator may be included in GPU pipeline 20. Adaptive multi-shader 18 receives streams of image data from components within GPU pipeline 20 for processing at each of the shader stages. As described in more detail below, adaptive multi-shader 18 receives vertex data from vertex shader thread module 24, primitive data from attribute gradient thread module 32, and pixel data from attribute interpolation thread module 34 and fragment shader thread module 36. Upon receiving one of the streams of image data from GPU pipeline 20, adaptive multi-shader 18 utilizes one or more high-precision ALUs and low-precision ALUs to process the image data based on the type of the image data.

Command engine 22 receives image data and rendering commands from controller 12 of device 10. Command engine 22 passes the image data along GPU pipeline 20 to vertex shader thread module 24. Vertex shader thread module 24 reads vertices from the image data and sends streams of vertex data to adaptive multi-shader 18. Adaptive multi-shader 18 determines that the vertex data is suitable for high-precision processing and then processes the vertex data using high-precision ALUs. Adaptive multi-shader 18 performs vertex shading to determine surface properties of the image at the vertices within the image data. In this way, adaptive multi-shader 18 generates vertex coordinates and attributes of the vertices within the image data. Adaptive multi-shader 18 stores the processed vertex data in unified storage 16, which acts as a unified register file for adaptive multi-shader 18.

In some embodiments, adaptive multi-shader 18 sends only the vertex coordinates of the vertices within the image data back to primitive setup module 26 within GPU pipeline 20. In other embodiments, adaptive multi-shader 18 may send the vertex coordinates along with other image data information back to primitive setup module 26. The vertex coordinates identify the vertices within the image data based on, for example, a four-dimensional coordinate system with X, Y, and Z (width, height, and depth) coordinates that identify a location of a vertex within the image data, and a W coordinate that comprises a perspective parameter for the image data. The vertex attributes, for example, may include color, normal, and texture coordinates associated with a vertex.

Primitive setup and rejection module 26 forms primitives with one or more vertices within the image data. Primitives are the simplest types of geometric figures and may include points, lines, triangles, and other polygons. Primitive setup and rejection module 26 may also reject primitives by performing scissoring and backface culling using the XY coordinates of the vertices within the image data. Rasterizer 28 converts the primitives of the image data into pixels based on the XY coordinates of vertices within the primitives and the number of pixels included in the primitives. Hidden primitive and pixel rejection module 30 rejects hidden primitives and hidden pixels within the primitives using the early depth and stencil test based on the Z coordinates of the vertices within the primitives.

Attribute gradient thread module 32 sends streams of primitive data to adaptive multi-shader 18 to prompt adaptive multi-shader 18 to perform attribute gradient setup. The primitive data may indicate primitives for the image data. Adaptive multi-shader 18 stores the primitive data in unified storage 16. Adaptive multi-shader 18 retrieves the vertex attributes of each of the vertices within primitives for the image data from unified storage 16. Adaptive multi-shader 18 computes gradients of attributes associated with the primitives for the image data. An attribute gradient comprises a difference between the attribute value at a first pixel and the attribute value at a second pixel within a primitive moving in either a horizontal (X) direction or a vertical (Y) direction.

Attribute interpolation thread module 34 forms a stream of pixel data for each of the primitives not rejected by primitive setup and rejection module 26 or hidden primitive and pixel rejection module 30. Once the attribute gradient values are computed, attribute interpolation thread module 34 sends streams of pixel data to adaptive multi-shader 18 to prompt adaptive multi-shader 18 to perform attribute interpolation and pixel rendering. The pixel data may indicate pixels within the primitives for the image data. Adaptive multi-shader 18 stores the pixel data in unified storage 16. Adaptive multi-shader 18 interpolates the attributes over the pixels within the primitives based on the attribute gradient values.

Fragment shader module 36 reads pixels from the image data and sends streams of pixel data to adaptive multi-shader 18. Adaptive multi-shader 18 determines that the pixel data is suitable for low-precision processing and then processes the pixel data using high-precision ALUs and low-precision ALUs. Adaptive multi-shader 18 performs fragment shading to determine surface properties of the computerized image at the pixels within the primitives for the image data. In this way, adaptive multi-shader 18 renders pixels of the primitives based on the interpolated attribute values. Adaptive multi-shader 18 stores the processed pixel data in unified storage 16. Results of adaptive multi-shader 18 will be output to a post-processor 38 for presentation of the processed image on display 8.

Figure 3:
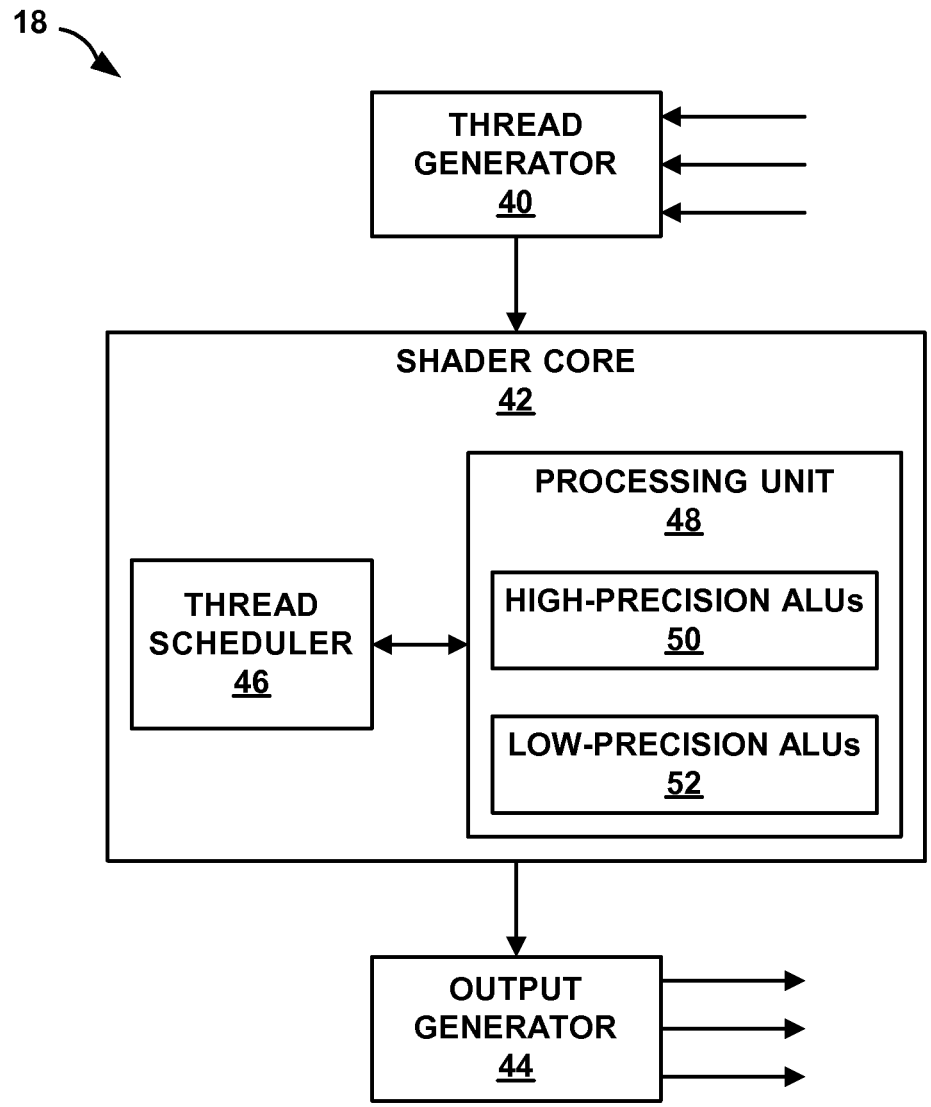
FIG. 3 is a block diagram illustrating an exemplary adaptive multi-shader according to an embodiment of this disclosure.

FIG. 3 is a block diagram illustrating adaptive multi-shader 18 included in GPU 14. Adaptive multi-shader 18 includes a thread generator 40, a shader core 42, and an output generator 44. Adaptive multi-shader 18 operates as both a vertex shader and a fragment shader to process image data received from GPU pipeline 20. Shader core 42 combines shader cores for a vertex shader and a fragment shader. Shader core 42 includes a thread scheduler 46 and a processing unit 48 with high-precision ALUs 50 and low-precision ALUs 52.

Within adaptive multi-shader 18, different types of image data include different preferences such as ALU precision, performance, and input and output format. For example, at the input stage to thread generator 40, pixels are normally formed directly into threads for rendering in groups, but vertices are parsed individually. Therefore, thread generator 40 may convert vertices in vector format to scalar format to be formed into threads for rendering in groups similar to pixels. As another example, at the output stage of output generator 44, both vertex and pixel data are converted from scalar format to vector format, but other types of image data may not be converted. Furthermore, pixel data is suitable for low-precision processing and low-precision output, but vertex data is suitable for both high-precision processing and high-precision output. In addition, pixel data is typically processed using group based processing, but vertex data is not necessary processed using group based processing. Finally, pixel data and vertex data do not have the same access frequency preferences; normally the ratio is approximately 4 to 1.

In order to address the different preferences of different types of image data within adaptive multi-shader 18, both high-precision ALUs 50 and low-precision ALUs 50 are implemented within processing unit 48. In addition, thread generator 40 reduces the vertex thread size since the thread scheduler 46 only accesses high-precision ALUs 50 to process the vertex data. Thread generator 40 keeps the pixel thread size the same size since thread scheduler 46 accesses both high-precision ALUs 50 and low-precision ALUs 52 to process the pixel data.

Typically, conventional multi-shaders implemented only high-precision ALUs in order to process image data suitable for high-precision processing, such as vertex data. However, high-precision ALUs consume large amounts of power and large areas of silicon within the GPU. In accordance with this disclosure, adaptive multi-shader 18 utilizes one or more of high-precision ALUs 50 and low-precision ALUs 52 to process image data based on the type of the image data. Adaptive multi-shader 18 may substantially reduce power consumption and silicon size of GPU 14 by implementing low-precision ALUs 52 while maintaining the ability to process image data using high-precision processing by implementing high-precision ALUs 50.

Each of high-precision ALUs 50 and low-precision ALUs 52 may comprise any number of ALUs. For example, in some cases, high-precision ALUs 50 may comprise two high-precision ALUs and low-precision ALUs 52 may comprise two low-precision ALUs. In other cases, high-precision ALUs 50 and low-precision ALUs 52 may each comprise greater than two ALUs. The terms "high-precision" and "low-precision" are general terms used herein to imply differences in precision relative to one another. For example, the terms simply imply that a high-precision ALU is more precise than a low-precision ALU. The terms do not necessarily imply any particular level of computational complexity. Additionally, the terms "high-precision" and "low-precision" are relative terms regarding the length of data words ALUs are capable of processing. For example, a high-precision ALU is capable of processing larger data words than a low-precision ALU.

As an example, high-precision ALUs 50 may comprise ALUs that accept image data represented in full precision floating point standard. The full precision floating point standard representation includes a 32 bit double word, which may be represented as numbered from 0 to 31, left to right. The first bit is the sign bit, S, the next eight bits are the exponent bits, E, and the final 23 bits are the fraction F: S EEEEEEEE FFFFFFFFFFFFFFFFFFFFFFF. High-precision ALUs 50 may also accept image data represented as larger or smaller data words than the full precision floating point standard. In contrast, low-precision ALUs 52 may comprise ALUs that accept image data represented in half precision floating point standard. The half-precision floating point standard representation includes a 16 bit word, which may be represented as numbered from 0 to 15, left to right. The first bit is the sign bit, S, the next 5 bits are the exponent bits, E, and the final 10 bits are the fraction F: S EEEEE FFFFFFFFFF. Low-precision ALUs 52 may also accept image data represented as smaller data words than the half-precision floating point standard. The full precision floating point and the half-precision floating point follow similar rules regarding basic arithmetic operations such as addition, subtraction, multiplication, and division.

Thread generator 40 receives streams of image data from GPU pipeline 20 for processing. Thread generator 40 may receive streams of different types of data from different components within GPU pipeline 20. Thread generator 40 determines the type of the image data included in the received stream. Thread generator 40 may determine the type of the image data by determining whether the image data is suitable for high-precision processing, such as vertex data, or low-precision processing, such as pixel data. In some cases, thread generator 40 may determine the type of the image data by determining from which of the components within GPU pipeline 20 the image data was received. For example, image data received from vertex shader thread module 24 within GPU pipeline 20 comprises vertex data suitable for high-precision processing. Furthermore, image data received from fragment shader thread module 36 within GPU pipeline 20 comprises pixel data suitable for low-precision processing.

As described in greater detail below with respect to FIG. 5, thread generator 40 performs several operations to prepare the received streams of image data for processing within shader core 42. Thread generator 40 converts the image data to scalar format when the image data is in vector format. Thread generator 40 typically receives vertex data in vector format from GPU pipeline 20 and converts the vertex data to scalar format. Thread generator 40 typically receives pixel data and other types of image data in scalar format. Thread generator 40 then combines portions of the image data in scalar format into threads based on the type of the data. For example, thread generator 40 combines portions of the image data in scalar format into a thread based on the number of high-precision ALUs 50 included in shader core 42 when the image data is suitable for high-precision processing. Thread generator 40 combines portions of the image data in scalar format into a thread based on the number of high-precision ALUs 50 and the number of low-precision ALUs 52 included in shader core 42 when the image data is suitable for low-precision processing.

Thread generator 40 then sends the threads to thread scheduler 46 included in shader core 42. Thread scheduler 46 directs processing unit 48 to process the threads using high-precision ALUs 50 when the threads include image data suitable for high-precision processing. Thread scheduler 46 directs processing unit 48 to process the threads using high-precision ALUs 50 and low-precision ALUs 52 when the threads include image data suitable for low-precision processing. Processing unit 48 may store the processed threads in unified storage 16 for later use by adaptive multi-shader 18.

The high-precision image data may be represented in the full precision floating point standard such that high-precision ALUs 50 are capable of accepting and processing the image data. If the image data within the threads is not represented properly, thread scheduler 46 may convert the image data within the threads into the full precision floating point standard.

The low-precision image data within the threads may be represented in the half precision floating point standard such that low-precision ALUs 52 are capable of accepting and processing the image data. However, in accordance with an embodiment of this disclosure, processing unit 48 may process the low-precision image data using both high-precision ALUs 50 and low-precision ALUs 52, which utilize different data format representations. Thread scheduler 46 may first determine which portion of the image data will be processed using high-precision ALUs 50 and then convert that portion of the image data into the proper representation. More specifically, thread scheduler 46 directs processing unit 48 to process a first portion of the image data included in the threads using high-precision ALUs 50, and thread scheduler 46 directs processing unit 48 to process a second portion of the image data included in the threads using low-precision ALUs 52. Thread scheduler then converts the first portion of the image data within the threads into the full precision floating point standard such that high-precision ALUs 50 are capable of accepting and processing the first portion of the image data.

As described in greater detail below with respect to FIG. 6, output generator 44 performs several operations to prepare the processed threads for further processing GPU pipeline 20. Output generator 44 retrieves the processed threads from shader core 42 and converts the processed threads from scalar format to vector format. Typically output generator 44 converts the processed threads to vector format regardless of the type of image data included in the threads. However, in some cases, output generator 44 will not convert the processed threads such that the image data included in the processed threads remains in scalar format. Output generator 44 then generates a stream of processed image data included in the processed threads in vector format. Output generator 44 uncombines the processed threads in vector format into a stream of processed image data in vector format. Output generator 44 then outputs the stream of processed image data to GPU pipeline 20.

Figure 4:
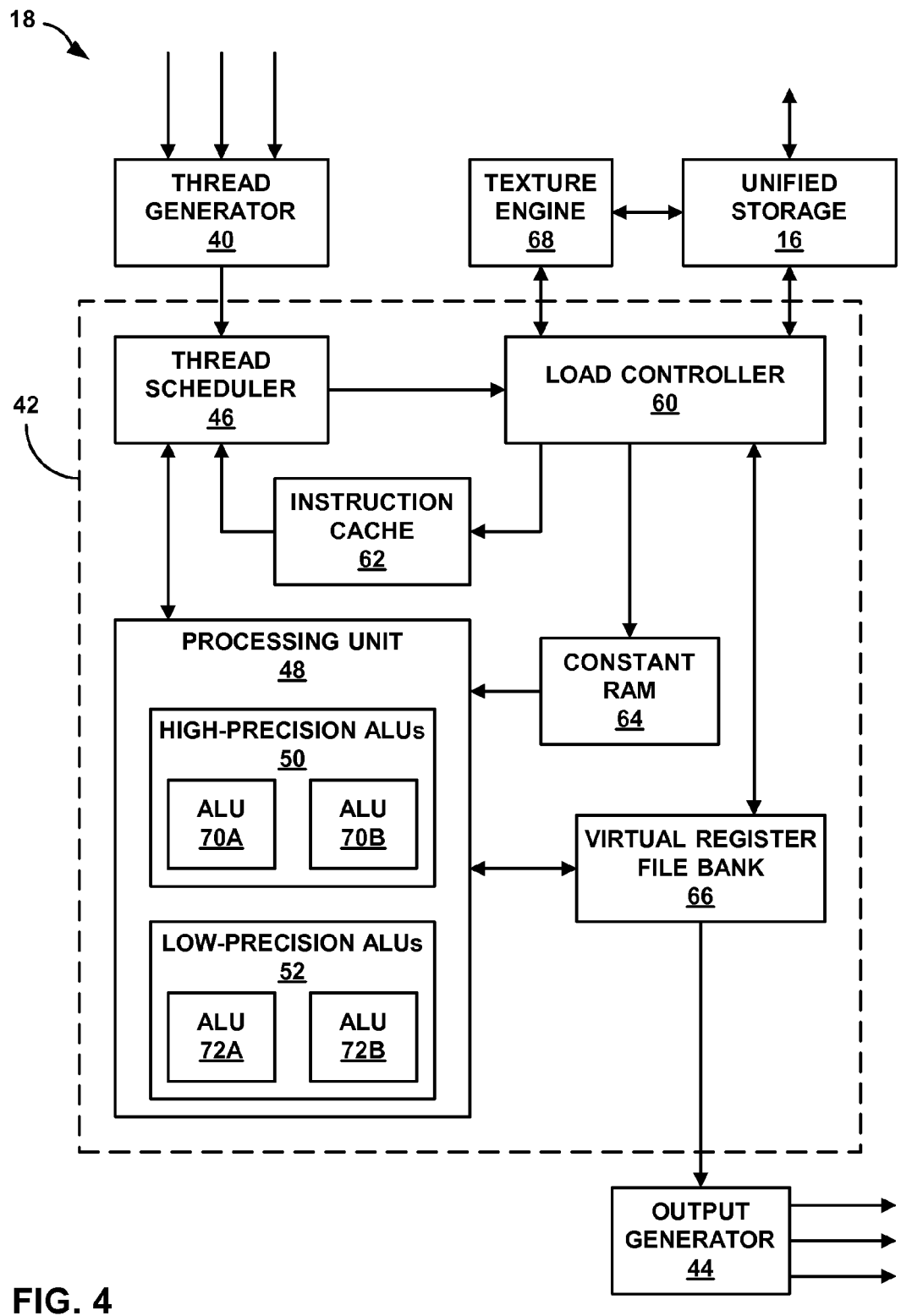
FIG. 4 is a block diagram illustrating the exemplary adaptive multi-shader of FIG. 3 in greater detail.

FIG. 4 is a block diagram illustrating adaptive multi-shader 18 in greater detail. Adaptive multi-shader 18 includes thread generator 40, shader core 42, and output generator 44. As illustrated in FIG. 4, shader core 42 includes thread scheduler 46, processing unit 48 with high-precision ALUs 50 and low-precision ALUs 52, load controller 60, instruction cache 62, constant RAM 64, and virtual register file bank 66. In accordance with an embodiment of this disclosure, high-precision ALUs 50 includes first high-precision ALU 70A and second high-precision ALU 70B, and low-precision ALUs 52 includes first low-precision ALU 72A and second low-precision ALU 72B. In addition, load controller 60 within shader core 42 couples to a texture engine 68 and to unified storage 16 located outside of adaptive multi-shader 18.

For purposes of illustration, the operation of adaptive multi-shader 18 illustrated in FIG. 4 will be described in terms of processing either pixel data or vertex data using two high-precision ALUs 70A and 70B and two low-precision ALUs 72A and 72B. In other embodiments, adaptive multi-shader 18 may receive other types of image data and perform processing based on the preferences of the other types of image data. Furthermore, adaptive multi-shader 18 may include more or less than two high-precision ALUs 70A and 70B, and more or less than two low-precision ALUs 72A and 72B.

Thread generator 40 receives streams of image data from GPU pipeline 20 for processing. Thread generator 40 determines whether the image data included in the received streams is pixel data or vertex data. If the image data is pixel data, thread generator 40 generates a quad pixel thread including four pixels of the image data in scalar format. In this way, each of the two high-precision ALUs 70A and 70B and two low-precision ALUs 72A and 72B will process one of the four pixels included in the quad pixel thread. If the image data is vertex data, thread generator 40 first converts the vertex data from vector format to scalar format and then generates a half-quad vertex thread including two vertices of the image data in scalar format. In this way, each of the two high-precision ALUs 70A and 70B will process one of the two vertices in scalar format included in the half-quad vertex thread.

According to this disclosure, thread generator 40 reduces the vertex thread size from quad to half-quad, which in turn reduces the size of virtual register file bank 68. The size of virtual register file bank 68 may be equal to $N*E*L$, where N is the total number of entries in virtual register file bank 68, E is the total number of elements included in each of the entries, and L is the length of the data in scalar format included in each of the elements. In the case of pixel image data, each thread includes four pixels of the image data in scalar format ($E=4$), and each of the pixels may be represented using the half-precision floating point standard with a length of 16 bits ($L=16$). In the case of vertex image data, each thread includes two vertices of the image data in scalar format ($E=2$), and each of the vertices may be represented using the full precision floating point standard has a length of 32 bits ($L=32$).

Since the size of the vertex thread is reduced from quad (E=4) to half-quad (E=2), virtual register file bank 68 may be half the size of a conventional virtual register file bank. The same benefit may also be applied to unified storage 16.

In addition, the reduction in the vertex thread size reduces the size of processing unit 48 by implementing only two high-precision ALUs 70A and 70B. The size of swizzle buffers included in thread generator 40 and output generator 44 to convert image data between scalar format and vector format may also be reduced. By reducing the vertex thread size, the total vertex data process is significantly reduced along with the need to buffer vertex data. This results in no performance impact on the pixel data process, and minimal performance impact for the vertex data process because the access ratio is low and thread utilization is improved.

Upon receiving one of the threads from thread generator 40, thread scheduler 46 interfaces with load controller 60 to schedule processing of the thread and synchronize the necessary resources for processing the thread. In some cases, load controller 60 may retrieve additional information associated with the thread from texture engine 68 and from an external source such as unified storage 16 and/or an external memory device coupled to unified storage 16.

Thread scheduler 46 retrieves instructions for the thread from instruction cache 62 that specify which of high-precision ALUs 50 and low-precision ALUs 52 to use for processing the thread based on the type of the image data included in the thread. The instructions for the thread are pre-programmed by application developers and loaded into instruction cache 62 during execution of the thread. In addition, thread scheduler 46 may generate a control command comprising a few bits to control the execution of the thread by one or more of high-precision ALUs 50 or low-precision ALUs 52 based on the type of the image data. Thread scheduler 46 then attaches the control command to the instructions retrieved from instruction cache 62. After attaching the control command to the retrieved instructions for the thread, thread scheduler 46 stores the thread in virtual register file bank 66 via load controller 60.

In some embodiments, the instructions for the thread may include one or more flags defined by the application developers that select the appropriate one or more high-precision ALUs 50 and low-precision ALUs 52 for processing the thread. As an example, thread scheduler 46 may retrieve instructions for a quad pixel thread that specify which of first high-precision ALU 70A, second high-precision ALU 70B, first low-precision ALU 72A, and second low-precision ALU 72B will process each of the four pixels included in the quad pixel thread. As another example, thread scheduler 46 may retrieve instructions for a half-quad vertex thread that specify which of first high-precision ALU 70A and second high-precision ALU 70B will process each of the two vertices in scalar format included in the half-quad vertex thread.

At the scheduled time for processing the thread, thread scheduler 46 sends the instructions for the thread to processing unit 48 to initiate processing of the thread. Upon receipt of instructions for a quad pixel thread, processing unit 48 retrieves the quad pixel thread from virtual register file bank 66. Thread scheduler 46 directs processing unit 48 to process the quad pixel thread using the two high-precision ALUs 70A and 70B and the two low-precision ALUs 72A and 72B in accordance with the instructions for the quad pixel thread. Upon receipt of instructions for a half-quad vertex thread, processing unit 48 retrieves the half-quad vertex thread from virtual register file bank 66. Thread scheduler 46 directs processing unit 48 to process the half-quad vertex thread using the two high-precision ALUs 70A and 70B in accordance with the instructions for the half-quad vertex thread.

Processing unit 48 temporarily stores the processed thread in virtual register file bank 66. Processing unit 48 also stores the processed thread in unified storage 16 via load controller 60 for later use by adaptive multi-shader 18. In addition, processing unit 48 sends the processed thread to thread scheduler 46. Output generator 44 retrieves the processed thread from virtual register file bank 66. Thread scheduler 46 then removes the processed thread from virtual register file bank 66 via load controller 60.

Output generator 44 converts the processed thread from scalar format to vector format. After converting a processed quad pixel thread into vector format, output generator 44 then generates a stream of four processed pixels included in the processed quad pixel thread in vector format. After converting a processed half-quad vertex thread into vector format, output generator 44 then generates a stream of two processed vertices included in the processed half-quad vertex thread in vector format. In either case, output generator 44 outputs the stream of processed image data to GPU pipeline 20.

Figure 5:
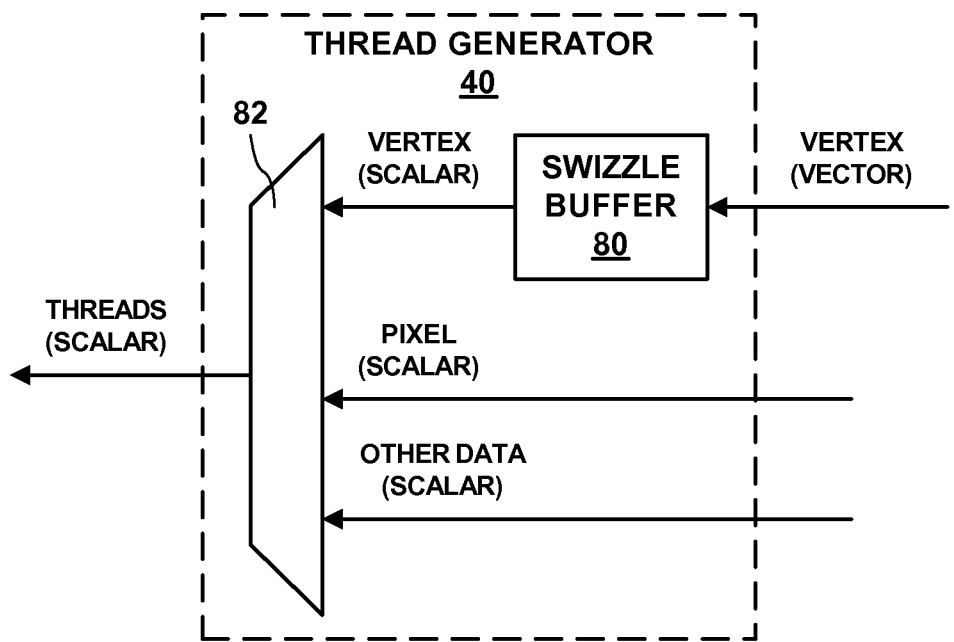
FIG. 5 is a block diagram illustrating a thread generator included in the adaptive multi-shader of FIG. 3.

FIG. 5 is a block diagram illustrating thread generator 40 included in adaptive multi-shader 18. In general, thread generator 40 receives a stream of image data, such as pixel data or vertex data, from GPU pipeline 20. Thread generator 40 then determines the type of the image data included in the received stream. Thread generator 40 may determine the type of the image data by determining whether the image data is suitable for high-precision processing, such as vertex data, or low-precision processing, such as pixel data. In some cases, thread generator 40 may determine the type of the image data by determining from which of the components within GPU pipeline 20 the image data was received. For example, image data received from vertex shader thread module 24 within GPU pipeline 20 comprises vertex data suitable for high-precision processing. Furthermore, image data received from fragment shader thread module 36 within GPU pipeline 20 comprises pixel data suitable for low-precision processing.

As illustrated in FIG. 5, thread generator 40 includes a swizzle buffer 80 and a multiplexer 82. Swizzle buffer 80 converts image data from vector format to scalar format. In some cases, thread generator 40 receives streams of image data in vector format. Thread generator 40 then applies the image data in vector format to swizzle buffer 80 to convert the image data to scalar format. For example, thread generator 40 typically receives vertex data in vector format from GPU pipeline 20 and swizzle buffer 80 converts the vertex data to scalar format. In other cases, thread generator 40 receives streams of image data already in scalar format such that the image data is not converted by swizzle buffer 80. For example, thread generator 40 typically receives pixel data and other types of image data in scalar format.

The image data in scalar format is then fed into multiplexer 82, which combines the image data into threads based on the type of the image data. In particular, multiplexer 82 combines portions of the image data in scalar format into a thread based on the number of high-precision ALUs 50 included in shader core 42 when the image data is suitable for high-precision processing. Multiplexer 82 also combines portions of the image data in scalar format into a thread based on the number of high-precision ALUs 50 and the number of low-precision ALUs 52 included in shader core 42 when the image data is suitable for low-precision processing. For example, upon receiving vertex data suitable for high-precision processing, multiplexer 82 combines one or more vertices in scalar format into a vertex thread based on the number of high-precision ALUs 50 included in shader core 42. Furthermore, upon receiving pixel data suitable for low-precision processing, multiplexer 82 combines one or more pixels in scalar format into a pixel thread based on the number of high-precision ALUs 50 and the number of low-precision ALUs 52 included in shader core 42. Thread generator 40 then sends the threads to shader core 42.

Figure 6:
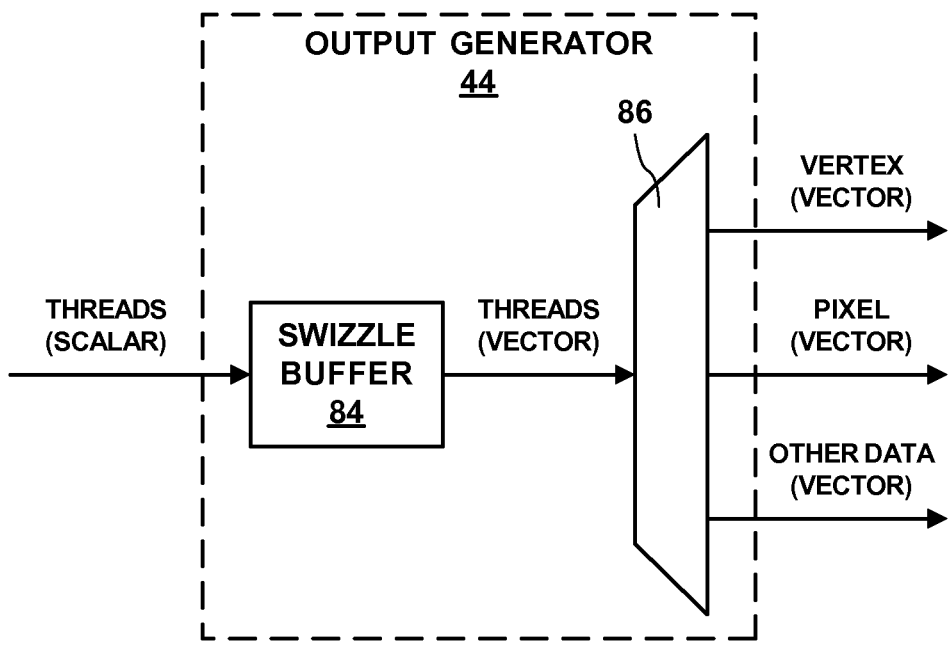
FIG. 6 is a block diagram illustrating an output generator included in the adaptive multi-shader of FIG. 3.

FIG. 6 is a block diagram illustrating an output generator 44 included in adaptive multi-shader 18. In general, output generator 44 retrieves processed threads, such as pixel threads or vertex threads, in vector format from shader core 42. As illustrated in FIG. 6, output generator 44 includes a swizzle buffer 84 and a multiplexer 86. Swizzle buffer 84 converts processed threads from scalar format to vector format. Typically output generator 44 receives processed threads in scalar format. Output generator 44 then applies the processed threads to swizzle buffer 84 to convert the processed threads to vector format regardless of the type of image data included in the processed threads. However, in some cases, output generator 44 may receive processed threads in scalar format including image data that is not converted by swizzle buffer 84 such that the image data remains in scalar format.

The processed threads in vector format are then fed into demultiplexer 86 that uncombines the processed threads into a stream of processed image data in vector format. For example, the processed image data may be processed vertex data in vector format or processed pixel data in vector format. Output generator 44 then outputs the stream of processed image data to GPU pipeline 20 (118).

Figure 7:
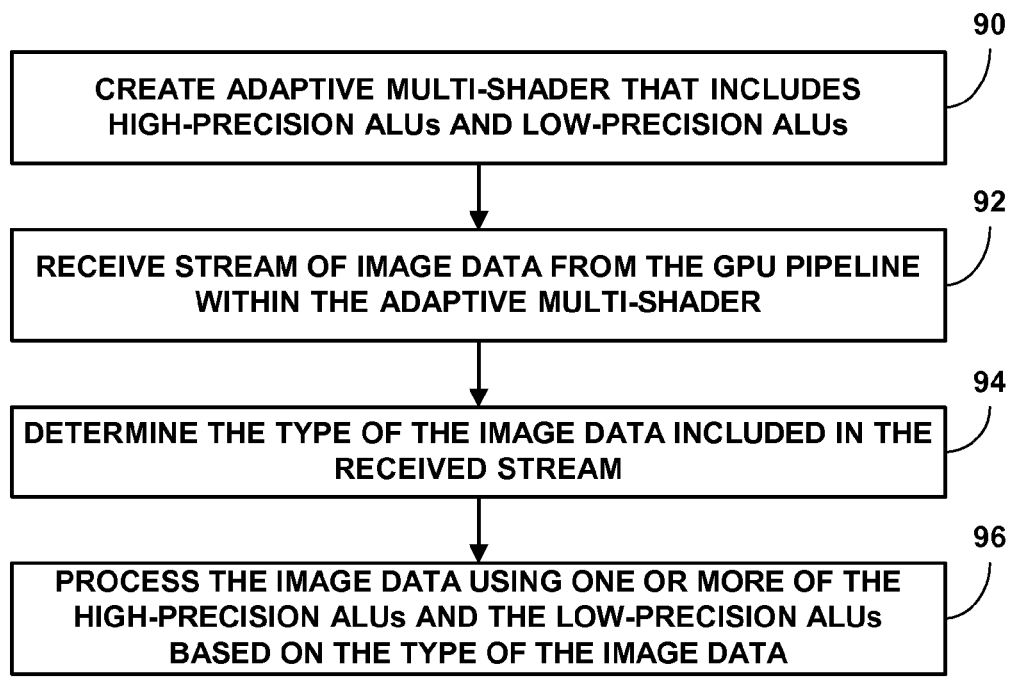
FIG. 7 is a flowchart illustrating an exemplary operation of processing image data within an adaptive multi-shader using one or more high-precision ALUs and low-precision ALUs.

FIG. 7 is a flowchart illustrating an exemplary operation of processing image data within an adaptive multi-shader using one or more high-precision ALUs and low-precision ALUs. The operation will be described herein in reference to GPU 14 from FIG. 1. Adaptive multi-shader 18 may be created within GPU 14 during manufacture of device 10 to include both high-precision ALUs and low-precision ALUs (90). Adaptive multi-shader 18 is coupled to both GPU pipeline 20 and unified storage 16.

Adaptive multi-shader 18 receives a stream of image data from one of the components within GPU pipeline 20 (92). Adaptive multi-shader 18 then determines the type of the image data included in the received stream (94). Adaptive multi-shader 18 processes the image data using one or more of the high-precision ALUs and the low-precision ALUs based on the type of the image data (96). After processing the image data, adaptive multi-shader 18 may store the processed image data in unified storage 16 and send the processed image data back to GPU pipeline 20 for additional processing.

Figure 8:
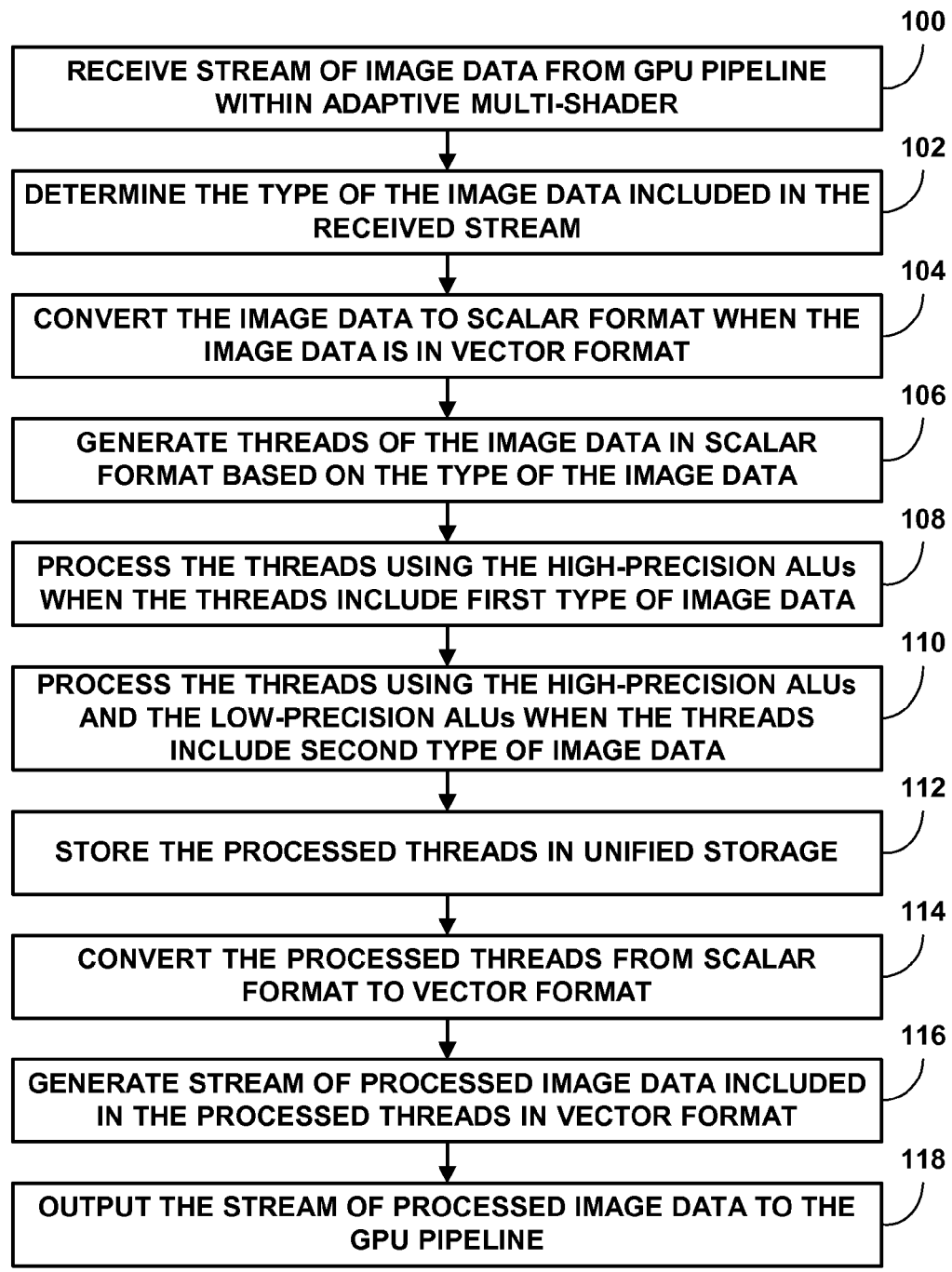
FIG. 8 is a flowchart illustrating an exemplary operation of processing image data within the adaptive multi-shader in greater detail.

FIG. 8 is a flowchart illustrating an exemplary operation of processing image data within an adaptive multi-shader using one or more high-precision ALUs and low-precision ALUs in greater detail. The operations of FIG. 8 will be described herein in reference to adaptive multi-shader 18 from FIG. 3, although other devices or components could perform the operations shown in FIG. 8. As illustrated in FIG. 3, adaptive multi-shader 18 includes thread generator 40, shader core 42, and output generator 44.

Thread generator 40 receives a stream of image data from one of the components within GPU pipeline 20 (100). Thread generator 40 then determines the type of the image data included in the received stream (102). Thread generator 40 may determine the type of the image data by determining whether the image data is suitable for high-precision processing, such as vertex image data, or low-precision processing, such as pixel image data. In some cases, thread generator 40 may determine the type of the image data by determining from which of the components within GPU pipeline 20 the image data was received. For example, image data received from vertex shader thread module 24 within GPU pipeline 20 comprises vertex data suitable for high-precision processing. Furthermore, image data received from fragment shader thread module 36 within GPU pipeline 20 comprises pixel data suitable for low-precision processing.

Thread generator 40 converts the image data to scalar format when the image data is in vector format (104). Thread generator 40 then generates threads of the image data in scalar format based on the type of the image data (106). As illustrated in FIG. 5, thread generator 40 may include swizzle buffer 80 and multiplexer 82. Thread generator 40 typically receives vertex data in vector format from GPU pipeline 20 and swizzle buffer 80 converts the vertex data to scalar format. Thread generator 40 typically receives pixel data and other types of image data in scalar format. The image data in scalar format is then fed into multiplexer 82 that combines portions of the image data into threads based on the type of the data. For example, multiplexer 82 combines portions of the image data in scalar format into a thread based on the number of high-precision ALUs 50 included in shader core 42 when the image data is suitable for high-precision processing. Multiplexer 82 combines portions of the image data in scalar format into a thread based on the number of high-precision ALUs 50 and the number of low-precision ALUs 52 included in shader core 42 when the image data is suitable for low-precision processing.

Thread generator 40 then sends the threads to thread scheduler 46 included in shader core 42. Thread scheduler 46 directs processing unit 48 to process the threads using high-precision ALUs 50 when the threads include a first type of image data suitable for high-precision processing (108). Thread scheduler 46 directs processing unit 48 to processes the threads using high-precision ALUs 50 and low-precision ALUs 52 when the threads include a second type of image data suitable for low-precision processing (110). Processing unit 48 may store the processed threads in unified storage 16 for later use by adaptive multi-shader 18 (112).

Output generator 44 retrieves the processed threads from shader core 42. Output generator 44 converts the processed threads from scalar format to vector format (114). Output generator 44 then generates a stream of processed image data included in the processed threads in vector format (116). As illustrated in FIG. 6, output generator 44 may include swizzle buffer 84 and demultiplexer 86. Output generator 44 retrieves the processed threads in scalar format from shader core 42 and swizzle buffer 84 converts the processed threads to vector format. Typically the processed threads are converted to vector format regardless of the type of data included in the threads. However, in some cases, the processed threads will not be applied to swizzle buffer 84 such that the image data included in the processed threads remains in scalar format. The processed threads in vector format are then fed into demultiplexer 86 that uncombines the processed threads into a stream of processed image data in vector format. Output generator 44 then outputs the stream of processed image data to GPU pipeline 20 (118).

Figure 9:
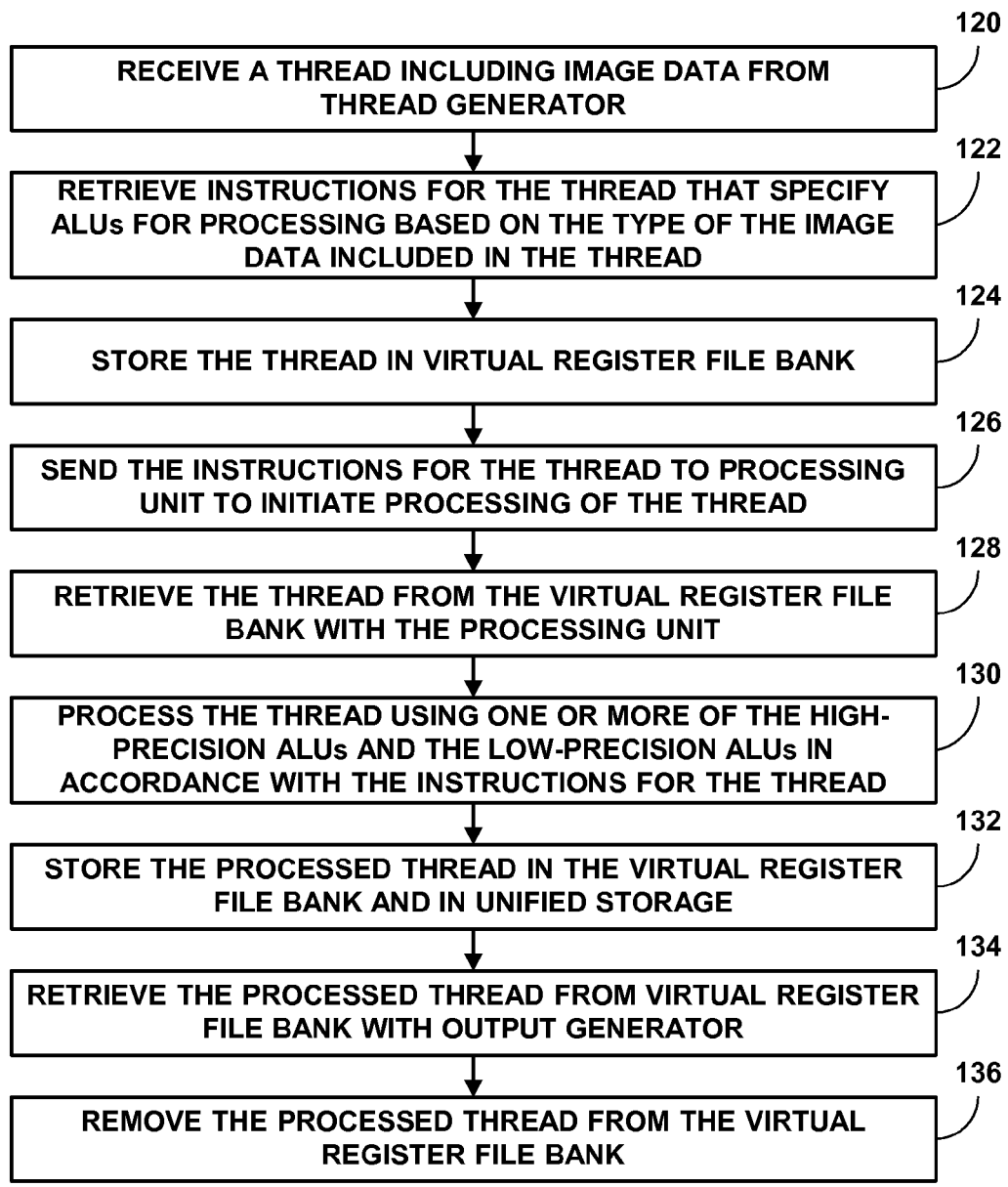
FIG. 9 is a flowchart illustrating an exemplary operation of processing image data within a shader core of the adaptive multi-shader.

FIG. 9 is a flowchart illustrating an exemplary operation of processing image data within a shader core of an adaptive multi-shader using one or more high-precision ALUs and low-precision ALUs. The operations of FIG. 9 will be described herein in reference to adaptive multi-shader 18 from FIG. 4, although other devices or components could perform the operations shown in FIG. 9. As illustrated in FIG. 4, shader core 42 includes thread scheduler 46, processing unit 48, load controller 60, instruction cache 62, constant RAM 64 and virtual register file bank 66.

Thread scheduler 46 receives a thread including image data from thread generator 40 (120). Thread scheduler 46 interfaces with load controller 60 to schedule processing of the thread and synchronize the necessary resources. Thread scheduler 46 retrieves instructions for the thread that specify which of high-precision ALUs 50 and low-precision ALUs 52 to use for processing the thread based on the type of the image data included in the thread (122). The instructions for the thread are pre-programmed by application developers and loaded into instruction cache 62 during execution of the thread. In some embodiments, the instructions for the thread may include one or more flags defined by the application developers that select the appropriate one or more high-precision ALUs 50 and low-precision ALUs 52 for processing the thread. In addition, thread scheduler 46 may generate a control command to control the execution of the thread by one or more of high-precision ALUs 50 or low-precision ALUs 52 based on the type of the image data, and attach the control command to the instructions retrieved from instruction cache 62. Thread scheduler 46 then stores the thread in virtual register file bank 66 via load controller 60 (124).

At the scheduled time for processing the thread, thread scheduler 46 sends the instructions for the thread to processing unit 48 to initiate processing of the thread (126). Upon receipt of the instructions for the thread, processing unit 48 retrieves the thread from virtual register file bank 66 (128). Processing unit 48 then processes the thread using one or more of high-precision ALUs 50 and low-precision ALUs 52 in accordance with the instructions for the thread (130). For example, the instructions from thread scheduler 46 direct processing unit 48 to process the thread using high-precision ALUs 50 when the thread is suitable for high-precision processing. The instructions from thread scheduler 46 direct processing unit 48 to process the thread using high-precision ALUs 50 and low-precision ALUs 52 when the thread is suitable for low-precision processing.

Processing unit 48 stores the processed thread in virtual register file bank 66 and in unified storage 16 via load controller 60 (132). Processing unit 48 also sends the processed thread to thread scheduler 46. Output generator 44 retrieves the processed thread from virtual register file bank 66 (134). Thread scheduler 46 then removes the processed thread from virtual register file bank 66 via load controller 60 (136).

Figure 10:
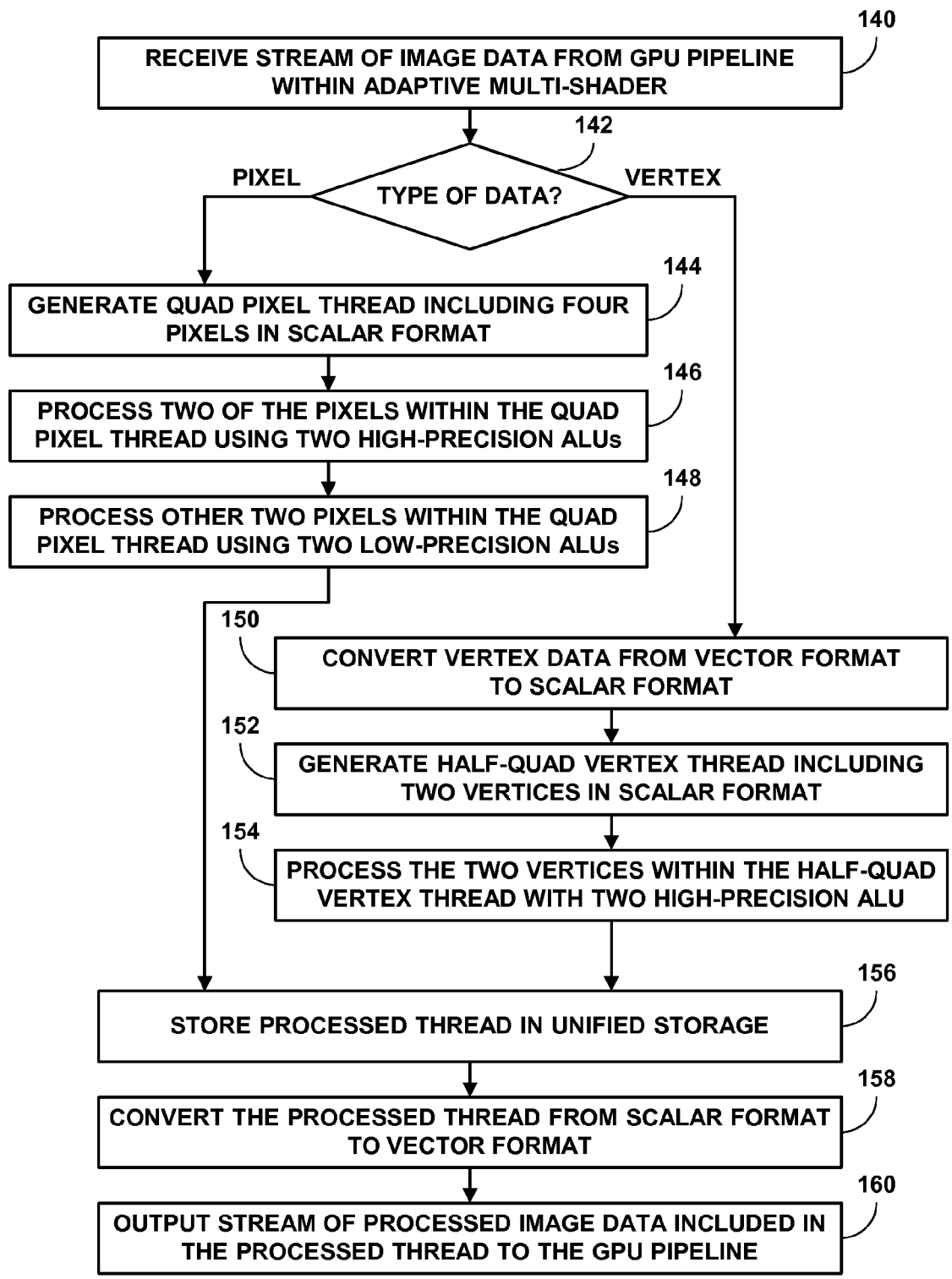
FIG. 10 is a flowchart illustrating an exemplary operation of processing image data that comprises either pixel data or vertex data within the adaptive multi-shader.

FIG. 10 is a flowchart illustrating an exemplary operation of processing image data that comprises either pixel data or vertex data within an adaptive multi-shader. The operations of FIG. 10 will be described herein in reference to adaptive multi-shader 18 from FIG. 4, although other devices or components could perform the operations shown in FIG. 10. Again, adaptive multi-shader 18 of FIG. 4 includes high-precision ALUs 50 with first ALU 70A and second ALU 70B, and low-precision ALUs 52 with first ALU 72A and second ALU 72B.

Thread generator 40 receives a stream of image data from GPU pipeline 20 (140). Thread generator 40 then determines whether the image data included in the received stream is pixel data or vertex data (142). Thread generator 40 may determine the type of the image data by determining from which of the components within GPU pipeline 20 the image data was received. For example, image data received from vertex shader thread module 24 within GPU pipeline 20 comprises vertex data. Furthermore, image data received from fragment shader thread module 36 within GPU pipeline 20 comprises pixel data.

If the image data is pixel data, thread generator 40 generates a quad pixel thread including four pixels of the image data in scalar format (144). Thread generator 40 then sends the quad pixel threads to thread scheduler 46 included in shader core 42. Thread scheduler 46 directs processing unit 48 to process two of the pixels included in the quad pixel thread using first high-precision ALU 70A and second high-precision ALU 70B (146). Thread scheduler 46 also directs processing unit 48 to process the other two of the pixels included in the quad pixel thread using first low-precision ALU 72A and second low-precision ALU 72B (148).

If the image data is vertex data, thread generator 40 converts the vertex data from vector format to scalar format (150). Thread generator 40 then generates a half-quad vertex thread including two vertices of the image data in scalar format (152). Thread generator 40 then sends the half-quad vertex threads to thread scheduler 46 included in shader core 42. Thread scheduler 46 directs processing unit 48 to process the two of vertices included in the half-quad vertex thread using first high-precision ALU 70A and second high-precision ALU 70B (154).

Processing unit 48 may store the processed thread in unified storage 16 for later use by adaptive multi-shader 18 (156). Output generator 44 retrieves the processed thread from shader core 42. Output generator 44 converts the processed threads from scalar format to vector format (158). Output generator 44 then generates a stream of processed image data included in the processed thread in vector format. Output generator 44 outputs the stream of processed image data to GPU pipeline 20 (160).

A number of embodiments have been described. However, various modifications to these embodiments are possible, and the principles presented herein may be applied to other embodiments as well. Methods as described herein may be implemented in hardware, software, and/or firmware. The various tasks of such methods may be implemented as sets of instructions executable by one or more arrays of logic elements, such as microprocessors, embedded controllers, or IP cores. In one example, one or more such tasks are arranged for execution within a mobile station modem chip or chipset that is configured to control operations of various devices of a personal communications device such as a cellular telephone.

The techniques described in this disclosure may be implemented within a general purpose microprocessor, digital signal processor (DSP), application specific integrated circuit (ASIC), field programmable gate array (FPGA), or other equivalent logic devices. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

As further examples, an embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

In this disclosure, an adaptive multi-shader within a processor has been described that uses one or more high-precision ALUs and low-precision ALUs to process data based on the type of the data. Upon receiving a stream of data, the adaptive multi-shader first determines the type of the data. For example, the adaptive-multi-shader may determine whether the data is suitable for high-precision processing or low-precision processing. The adaptive multi-shader then processes the data using the high-precision ALUs when the data is suitable for high-precision processing, and processes the data using the high-precision ALUs and the low-precision ALUs when the data is suitable for low-precision processing.

The adaptive multi-shader may substantially reduce power consumption and silicon size of the processor by implementing the low-precision ALUs while maintaining the ability to process data using high-precision processing by implementing the high-precision ALUs. The processor may comprise a multi-media processor, such as a GPU, a video processing unit, a still-image processing unit, or an audio processing unit. In the case where the processor is a GPU, reducing the vertex thread size from quad to half-quad may reduce the input and output swizzle buffer size, the virtual register file size, and the ALU size. In addition, the embodiments have no performance impact on the pixel data process, and the performance impact for the vertex data process is minimal because the access ratio is low and thread utilization is improved. The total vertex data process is significantly reduced, which further reduces the need to buffer vertex data. These and other embodiments are within the scope of the following claims.

The invention claimed is:

1. A method comprising:
receiving a stream of data from a processing pipeline with an adaptive multi-shader that includes high-precision arithmetic logic units (ALUs) and low-precision ALUs;
wherein the high-precision ALUs are different than the low-precision ALUs;
determining whether the data is vertex image data or pixel image data;
performing vertex shading using only the high-precision ALUs when the data is determined to be vertex image data, wherein performing the vertex shading comprises generating vertex coordinate data; and
processing the data using the high-precision ALUs and the low-precision ALUs when the data is determined to be pixel image data.

2. The method of claim 1, wherein determining whether the data is vertex image data or pixel image data comprises determining from which component within the processing pipeline the stream of data was received.

3. The method of claim 1, further comprising generating threads of the data based on whether the data is vertex image data or pixel image data.

4. The method of claim 3, wherein generating threads comprises:
combining portions of the data based on the number of high-precision ALUs included in the adaptive multi-shader when the data is vertex image data; and
combining portions of the data based on the number of high-precision ALUs and the number of low-precision ALUs included in the adaptive multi-shader when the data is pixel image data.

5. The method of claim 3, wherein generating threads comprising:
generating vertex threads that include one or more vertices in scalar format based on the number of high-precision ALUs included in the adaptive multi-shader when the data is vertex image data; and
generating pixel threads that include one or more pixels in scalar format based on the number of high-precision ALUs and the number of low-precision ALUs included in the adaptive multi-shader when the data is pixel image data.

6. The method of claim 3, further comprising:
retrieving instructions for each of the threads that specify which of the high-precision ALUs and the low-precision ALUs to use to process the thread based on whether the data is vertex image data or pixel image data; and
sending the instructions for each of the threads to a processing unit included in the adaptive multi-shader to initiate processing of the thread.

7. The method of claim 6, further comprising: processing each of the threads using one or more of the high-precision ALUs and the low-precision ALUs in accordance with the instructions for the thread.

8. A method comprising:
receiving a stream of image data from a graphics processing unit (GPU) pipeline with an adaptive multi-shader that includes two high-precision arithmetic logic units (ALUs) and two low-precision ALUs, wherein the two high-precisions ALUs are different than the two low-precision ALUs;
determining whether the image data included in the received stream is vertex data or pixel data;
performing vertex shading using only the two high-precision ALUs when the image data is determined to be vertex data, wherein performing the vertex shading comprises generating vertex coordinate data; and
processing the image data using the two high-precision ALUs and the two low-precision ALUs when the image data is determined to be pixel data.

9. The method of claim 8, further comprising:
converting the image data from vector format to scalar format when the image data is vertex data;
generating half-quad vertex threads that include two vertices of the image data in scalar format; and
processing the two vertices within the half-quad vertex thread using the two high-precision ALUs.

10. The method of claim 8, further comprising:
generating quad pixel threads that include four pixels of the image data when the data is pixel data;
processing two of the pixels within the quad pixel thread using the two low-precision ALUs; and
processing the other two pixels within the quad pixel thread using the two high-precision ALUs.

11. A non-transitory computer-readable medium comprising instructions that cause a processor, upon receiving a stream of data from a processing pipeline with an adaptive multi-shader that includes high-precision arithmetic logic units (ALUs) and low-precision ALUs to:
determine whether the data is vertex image data or pixel image data; and
perform vertex shading using the only high-precision ALUs when the data is determined to be vertex image data, wherein in performing the vertex shading the high-precision ALUs generate vertex coordinate data; and
process the data using the high-precision ALUs and the low-precision ALUs when the data is determined to be pixel image data;
wherein the high-precision ALUs are different than the low-precision ALUs.

12. The non-transitory computer-readable medium of claim 11, wherein the instructions cause the processor to determine whether the data is vertex image data or pixel image data comprise instructions to cause the processor to determine from which component within the processing pipeline the stream of data was received.

13. The non-transitory computer-readable medium of claim 11, further comprising instructions that cause the processor to generate threads of the data based on whether the data is vertex image data or pixel image data.

14. The non-transitory computer-readable medium of claim 13, wherein the instructions that cause the processor to generate threads comprise instructions that cause the processor to:
combine portions of the data based on the number of high-precision ALUs included in the adaptive multi-shader when the data is vertex image data; and
combine portions of the data based on the number of high-precision ALUs and the number of low-precision ALUs included in the adaptive multi-shader when the data is pixel image data.

15. The non-statutory computer-readable medium of claim 13, wherein the instructions that cause the processor to generate threads comprise instructions that cause the processor to:
generate pixel threads that include one or more pixels in scalar format based on the number of high-precision ALUs and the number of low-precision ALUs included in the adaptive multi-shader when the data is pixel image data.

16. The non-transitory computer-readable medium of claim 13, further comprising instructions that cause the processor to:
retrieve instructions for each of the threads that specify which of the high-precision ALUs and the low-precision ALUs to use to process the thread based on whether the data is vertex image data or pixel image data;
send the instructions for each of the threads to a processing unit included in the adaptive multi-shader to initiate processing of the thread; and
precision ALUs in accordance with the instructions for the thread.

17. A non-transitory computer-readable medium comprising instructions that cause a processor, upon receiving a stream of image data from a graphics processing unit (GPU) pipeline with an adaptive multi-shader that includes two high-precision arithmetic logic units (ALUs) and two low-precision ALUs to:
determine whether the image data included in the received stream is vertex data or pixel data;
perform vertex shading using the only two high-precision ALUs when the image data is determined to be vertex data, wherein in performing the vertex shading the two high-precision ALUs generate vertex coordinate data; and
process the image data using the two high-precision ALUs and the two low-precision ALUs when the image data is determined to be pixel data, wherein the two high-precision ALUs are different than the two low-precision ALUs.

18. The non-transitory computer-readable medium of claim 17, further comprising instructions that cause the processor to:
convert the image data from vector format to scalar format when the image data is vertex data;
generate half-quad vertex threads that include two vertices of the image data in scalar format; and
process the two vertices within the half-quad vertex thread using the two high-precision ALUs.

19. The non-transitory computer-readable medium of claim 17, further comprising instructions that cause the processor to:
generate quad pixel threads that include four pixels of the image data when the data is pixel data;
process two of the pixels within the quad pixel thread using the two low-precision ALUs; and
process the other two pixels within the quad pixel thread using the two high-precision ALUs.

20. A multi-shader comprising:
a thread generator that receives a stream of data from a processing pipeline and determines whether the data is vertex image data or pixel image data in the received stream;
a processing unit including high-precision arithmetic logic units (ALUs) and low-precision ALUs, wherein the high-precision ALUs are different than the low-precision ALUs; and
a thread scheduler that directs the processing unit to perform vertex shading using only the high-precision ALUs when the data is determined to be vertex image data, wherein in performing the vertex shading the high-precision ALUs generate vertex coordinate data, and wherein the thread scheduler directs the processing unit to process the data using the high-precision ALUs and the low precision ALUs when the data is determined to be pixel image data.

21. The multi-shader of claim 20, wherein the thread generator determines from which component within the processing pipeline the stream of data was received in order to determine whether the data is vertex image data or pixel image data.

22. The multi-shader of claim 20, wherein the thread generator generates threads of the data based on whether the data is vertex image data or pixel image data.

23. The multi-shader of claim 22, wherein the thread generator:
combines portions of the data based on the number of high-precision ALUs included in the adaptive multi-shader when the data is vertex image data; and
combines portions of the data based on the number of high-precision ALUs and the number of low-precision ALUs included in the adaptive multi-shader when the data is pixel image data.

24. The multi-shader of claim 22, wherein the thread generator:
generates vertex threads that include one or more vertices in scalar format based on the number of high-precision ALUs included in the adaptive multi-shader when the data is vertex image data; and
generates pixel threads that include one or more pixels in scalar format based on the number of high-precision ALUs and the number of low-precision ALUs included in the adaptive multi-shader when the data is pixel image data.

25. The multi-shader of claim 22, wherein the thread scheduler:
receives the threads from the thread generator;
retrieves instructions from an instruction cache for each of the threads that specify which of the high-precision ALUs and the low-precision ALUs to use to process the thread based on whether the data us vertex image data or pixel image data; and
sends the instructions for each of the threads to the processing unit to initiate processing of the thread.

26. The multi-shader of claim 25, wherein the processing unit receives the instructions for each of the threads from the thread scheduler, and processes each of the threads using one or more of the high-precision ALUs and the low-precision ALUs in accordance with the instructions for the thread.

27. The multi-shader of claim 20, wherein the processing pipeline is included within one of a graphics processing unit, a video processing unit, a still-image processing unit, or an audio processing unit.

28. A multi-shader comprising:
a thread generator that receives a stream of image data from a graphics processing unit (GPU) pipeline and determines whether the image data included in the received stream is vertex data or pixel data;
a processing unit including two high-precision arithmetic logic units (ALUs) and two low-precision ALUs wherein the two high-precision ALUs are different than the two low-precision ALUs; and
a thread scheduler that directs the processing unit to perform vertex shading using only the two high-precision ALUs when the image data is determined to be vertex data, wherein in performing the vertex shading the two high-precision ALUs generate vertex coordinate data, and wherein the thread scheduler directs the processing unit to process the image data using the two high-precision ALUs and the two low-precision ALUs when the image data is determined to be pixel data.

29. The multi-shader of claim 28,
wherein the thread generator converts the image data from vector format to scalar format when the image data is vertex data, and generates half-quad vertex threads that include two vertices of the image data in scalar format; and
wherein the thread scheduler directs the processing unit to process the two vertices within the half-quad vertex thread using the two high-precision ALUs.

30. The multi-shader of claim 28,
wherein the thread generator generates quad pixel threads that include four pixels of the image data when the data is pixel data; and
wherein the thread scheduler directs the processing unit to process two of the pixels within the quad pixel thread using the two low-precision ALUs, and directs the processing unit to process the other two pixels within the quad pixel thread using the two high-precision ALUs.

31. A multi-shader comprising:
means for receiving a stream of data from a processing pipeline and determining whether the data is vertex image data or pixel image data included in the received stream;
and means for performing vertex shading using only high-precision processing means when the data is vertex image data, wherein the means for performing vertex shading comprises means for generating vertex coordinate data; and
means for processing the data using the high-precision processing means and low-precision processing means when the data is pixel image data.

32. A multi-shader comprising:
means for receiving a stream of data from a processing pipeline with an adaptive multi-shader that includes high-precision arithmetic logic units (ALUs) and low-precision ALUs, wherein the high-precision ALUs are different than the low precision ALUs;
means for determining whether the data is vertex image data or pixel image data;
means for performing vertex shading using only the high-precision ALUs when the data is determined to be vertex image data, wherein the means for performing vertex shading comprises means for generating vertex coordinate data; and
means for processing the data using the high-precision ALUs and the low-precision ALUs when the data is determined to be pixel image data.

33. The multi-shader of claim 32, wherein the means for determining whether the data is vertex image data or pixel image data comprising means for determining from which component within the processing pipeline the stream of data was received.

34. The multi-shader of claim 32, further comprising means for generating threads of the data based on whether the data is vertex image data or pixel image data, wherein the means for generating threads comprises:
means for combining portions of the data based on the number of high-precision ALUs included in the adaptive multi-shader when the data is vertex image data; and
means for combining portions of the data based on the number of high-precision ALUs and the number of low-precision ALUs included in the adaptive multi-shader when the data is pixel image data.

35. The multi-shader of claim 32, further comprising means for generating threads of the data based on whether the data is vertex image data or pixel image data, wherein the means for generating threads comprises:
means for generating vertex threads that include one or more vertices in scalar format based on the number of high-precision ALUs included in the adaptive multi-shader when the data is vertex image data; and
means for generating pixel threads that include one or more pixels in scalar format based on the number of high-precision ALUs and the number of low-precision ALUs included in the adaptive multi-shader when the data is pixel image data.

36. The multi-shader of claim 34, further comprising:
means for retrieving instructions for each of the threads that specify which of the high-precision ALUs and the low-precision ALUs to use to process the thread based on whether the data is vertex image data or pixel image data;
means for sending the instructions for each of the threads to a processing unit included in the adaptive multi-shader to initiate processing of the thread; and
means for processing each of the threads using one or more of the high-precision ALUs and the low-precision ALUs in accordance with the instructions for the thread.

* * * * *